United States Patent
Bitra et al.

(10) Patent No.: US 9,609,620 B1
(45) Date of Patent: Mar. 28, 2017

(54) WIRELESS ACCESS POINT TILE DOWNLOAD PRIORITIZATION

(71) Applicant: QUALCOMM Incorporated, San Diego, CA (US)

(72) Inventors: Suresh Kumar Bitra, Mangalagiri (IN); Meghna Agrawal, Sunnyvale, CA (US); Ashok Bhatia, San Diego, CA (US); Wei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/985,232

(22) Filed: Dec. 30, 2015

(51) Int. Cl.
*H04W 24/00* (2009.01)
*H04W 64/00* (2009.01)

(52) U.S. Cl.
CPC .................................. *H04W 64/003* (2013.01)

(58) Field of Classification Search
USPC ...................................................... 455/456.1
See application file for complete search history.

(56) References Cited

U.S. PATENT DOCUMENTS

| | | |
|---|---|---|
| 2008/0176583 A1 | 7/2008 | Brachet et al. |
| 2012/0231808 A1 | 9/2012 | Moeglein |
| 2012/0309413 A1 | 12/2012 | Grosman et al. |
| 2013/0331113 A1 | 12/2013 | Grosman et al. |
| 2014/0029468 A1 | 1/2014 | Akgul et al. |

FOREIGN PATENT DOCUMENTS

WO    WO-2015007758 A1    1/2015

OTHER PUBLICATIONS

Co-pending U.S. Appl. No. 14/862,685, filed Sep. 23, 2015.
International Search Report and Written Opinion—PCT/US2016/060144—ISA/EPO—Jan. 18, 2017.

*Primary Examiner* — Joel Ajayi
(74) *Attorney, Agent, or Firm* — Kilpatrick Townsend & Stockton, LLP

(57) ABSTRACT

Techniques are disclosed for ranking wireless access points using crowdsourced information, and using these rankings to determine a priority of tiles to download to a mobile device. The number of tiles that may be downloaded by a mobile device and/or the number of wireless access points in each tile may be optimized, based on wireless access point rankings and tile priority.

15 Claims, 7 Drawing Sheets

WIRELESS ACCESS POINT TILE DOWNLOAD PRIORITIZATION

BACKGROUND

The position of a mobile device can be estimated based on wireless signals transmitted by wireless access points (APs) and received by the mobile device. If the mobile device knows the locations of the APs, the mobile device can estimate the position by using measurements of the wireless signals to calculate the distance or range between the mobile device and each AP. If the mobile device does not have the locations of the APs stored locally, the data can be requested from a server and downloaded.

Depending on the situation, there can be many APs in an area. To help organize the data for the APs and reduce the number of requests, the APs can be grouped into "tiles" based on their geographical location. Thus, a tile represents a geographical area in which a plurality of APs is located. The mobile device requests and downloads data for tiles from the server rather than individually for each AP. However, the number of APs in a tile and the amount of data for a tile can be very large, especially in areas with high population density. This can result in long download times, high power consumption when downloading, and the downloaded data taking up a large portion of the mobile device's memory.

SUMMARY

Techniques disclosed herein are directed toward ranking APs using crowdsourced information, and using these AP rankings to determine a priority of tiles to download to a mobile device. In some embodiments, the number of tiles that may be downloaded by a mobile device and/or the number of APs in each tile may be optimized, based on AP rankings and tile priority.

An example server for acquiring and distributing access point location data via crowdsourcing, according to the disclosure, comprises a communication interface, a memory, and a processing unit communicatively coupled with the communication interface and the memory. The processing unit is configured to cause the server to receive, via the communication interface, a plurality of measurements pertaining to a plurality of wireless access points, the plurality of measurements received from one or more mobile devices, and determine a priority value for each of a plurality of tiles, based on the plurality of received measurements, wherein each tile represents a geographical area in which one or more wireless access points of the plurality of wireless access points is located, and for each tile, the priority value is indicative of a popularity of the tile. The processing unit is further configured to cause the server to select a subset of the plurality of tiles based on the determined priority value for each of the plurality of tiles, and send, via the communication interface to a receiving mobile device, information for each tile of the selected subset of the plurality of tiles.

An example mobile device, according to the disclosure, comprises a communication interface, a memory, and a processing unit communicatively coupled with the communication interface and the memory. The processing unit is configured to cause the mobile device to send, via the communication interface to a server, a request for tile information, and receive, via the communication interface from the server, a prioritized list of tiles. The processing unit is configured to cause the mobile device to further determine, based on priority information of the prioritized list of tiles, one or more tiles from the prioritized list of tiles for which tile information is to be obtained, and obtain, via the communication interface from the server, tile information for each of the one or more tiles.

An example method of acquiring and distributing access point location data via crowdsourcing, according to the disclosure, comprises receiving a plurality of measurements pertaining to a plurality of wireless access points, the plurality of measurements received from one or more mobile devices, and determining a priority value for each of a plurality of tiles, based on the plurality of received measurements, wherein each tile represents a geographical area in which one or more wireless access points of the plurality of wireless access points is located, and for each tile, the priority value is indicative of a popularity of the tile. The method further comprises selecting a subset of the plurality of tiles based on the determined priority value for each of the plurality of tiles; and sending, via the communication interface to a receiving mobile device, information for each tile of the selected subset of the plurality of tiles.

Items and/or techniques described herein may provide one or more of the following capabilities, as well as other capabilities not mentioned. Techniques can provide for reduced bandwidth and/or memory usage for tile downloading and storing. These techniques may also help prolong the battery life of mobile devices. These and other advantages and features are described in more detail in conjunction with the text below and attached figures.

BRIEF DESCRIPTION OF THE DRAWINGS

An understanding of the nature and advantages of various embodiments may be realized by reference to the following figures.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

A wireless wide area network (WWAN) can utilize mobile telecommunication cellular network and/or other technology to enable mobile devices such as mobile phones, tablets, mobile gaming systems, personal media players, notebook computers, and similar electronic devices to transmit and receive data over a large geographical region. The position of a mobile device in such a network can be determined using various means, including satellite positioning system (SPS) data received by the mobile device, trilateration for signals received at antennas (e.g., cell towers), and more. The determination of a mobile device has become increasingly important with the use of positioning applications by mobile devices, governmental requirements for tracking mobile devices (e.g., E911), and the like.

One effective means for estimating the position of a mobile device is by detecting, with the mobile device, wireless signals transmitted by wireless (e.g., WiFi) access points (APs). If the mobile device knows the locations of the APs (which, because they are typically immobile, can be cataloged in an almanac and provided to the mobile device), the mobile device can estimate the position by using measurements of the wireless signals to calculate the distance or range between the mobile device and each AP. If the mobile device does not have the locations of the APs stored locally, the data can be requested from a server and downloaded.

Figure 2:
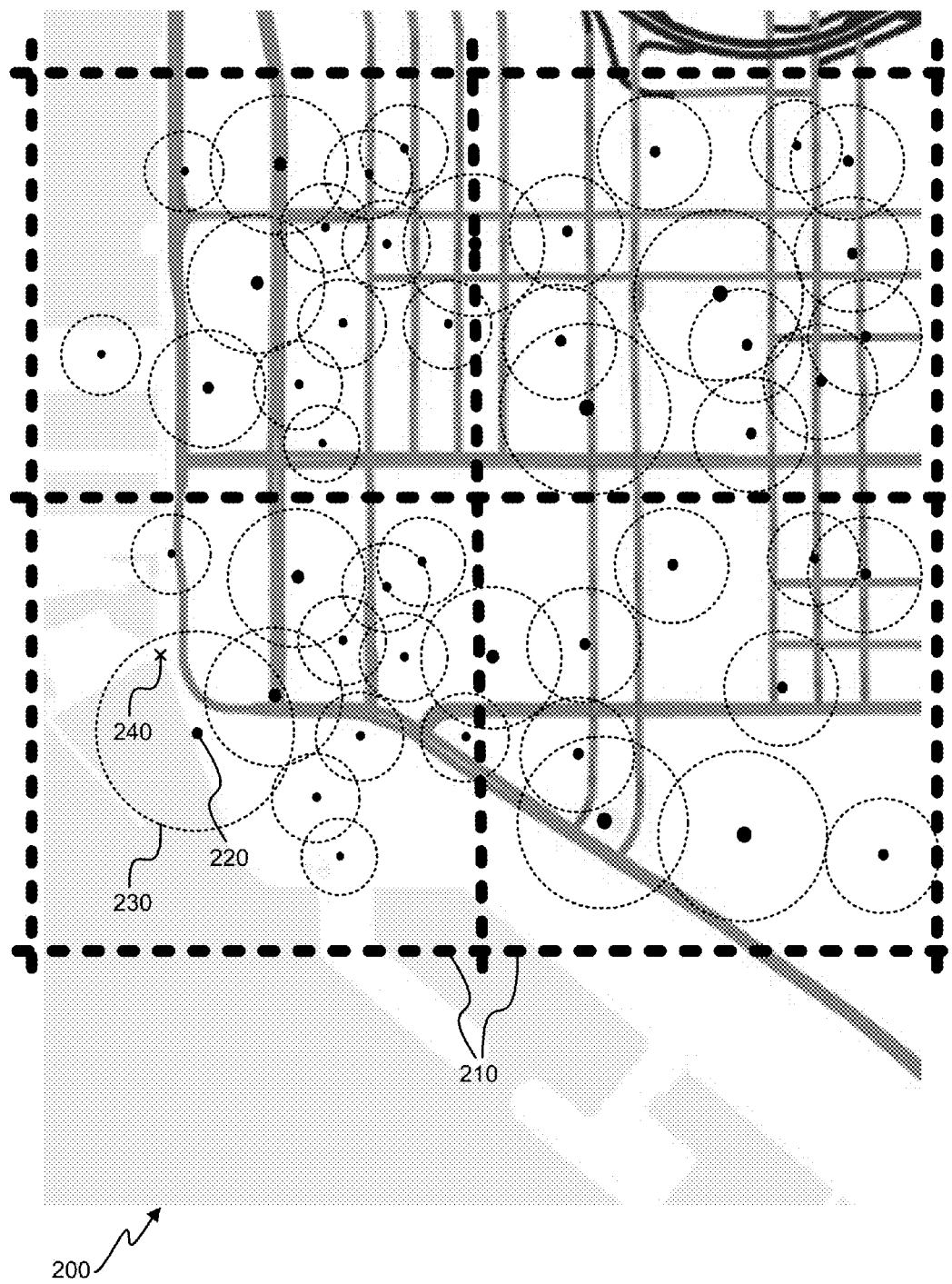
FIG. 2 is a map of an example area in which a positioning system, such as the positioning system of FIG. 1, may operate.

Depending on where a mobile device may be located, there may be many APs in a nearby area. To help organize the data for the APs and reduce the number of requests, the APs may be grouped into "tiles" based on their geographical location. A tile can represent a geographical area in which a plurality of APs is located. (It can be noted that, as used herein, the terms "tile" and "tile information" may be used interchangeably, and may refer both to a geographical region as shown in FIG. 2 or information related thereto.) The mobile device may request and download tile information for tiles from the server, rather than download data for each AP individually. However, the number of APs in a tile and the amount of data for a tile can be very large, especially in areas with high population density (and a corresponding higher concentration of APs). This can result in long download times, high power consumption when downloading, and the downloaded data can take up a large portion of the mobile device's memory.

With these issues in mind, techniques disclosed herein illustrate embodiments in which APs may be ranked and, based on these rankings, tiles may be prioritized. In some embodiments, the number of tiles that may be downloaded by a mobile device and/or the number of APs in each tile may be optimized. It can be noted that although embodiments herein describe the use of WiFi wireless technology, embodiments are not so limited. Other wireless technologies may be use in addition or as an alternative to WiFi. Through crowdsourced ranking of APs and tile prioritization, we can replace low-importance tiles and APs downloaded and stored on a mobile device with high-importance tiles and APs, thereby making more effective use of available memory and bandwidth.

Figure 1:
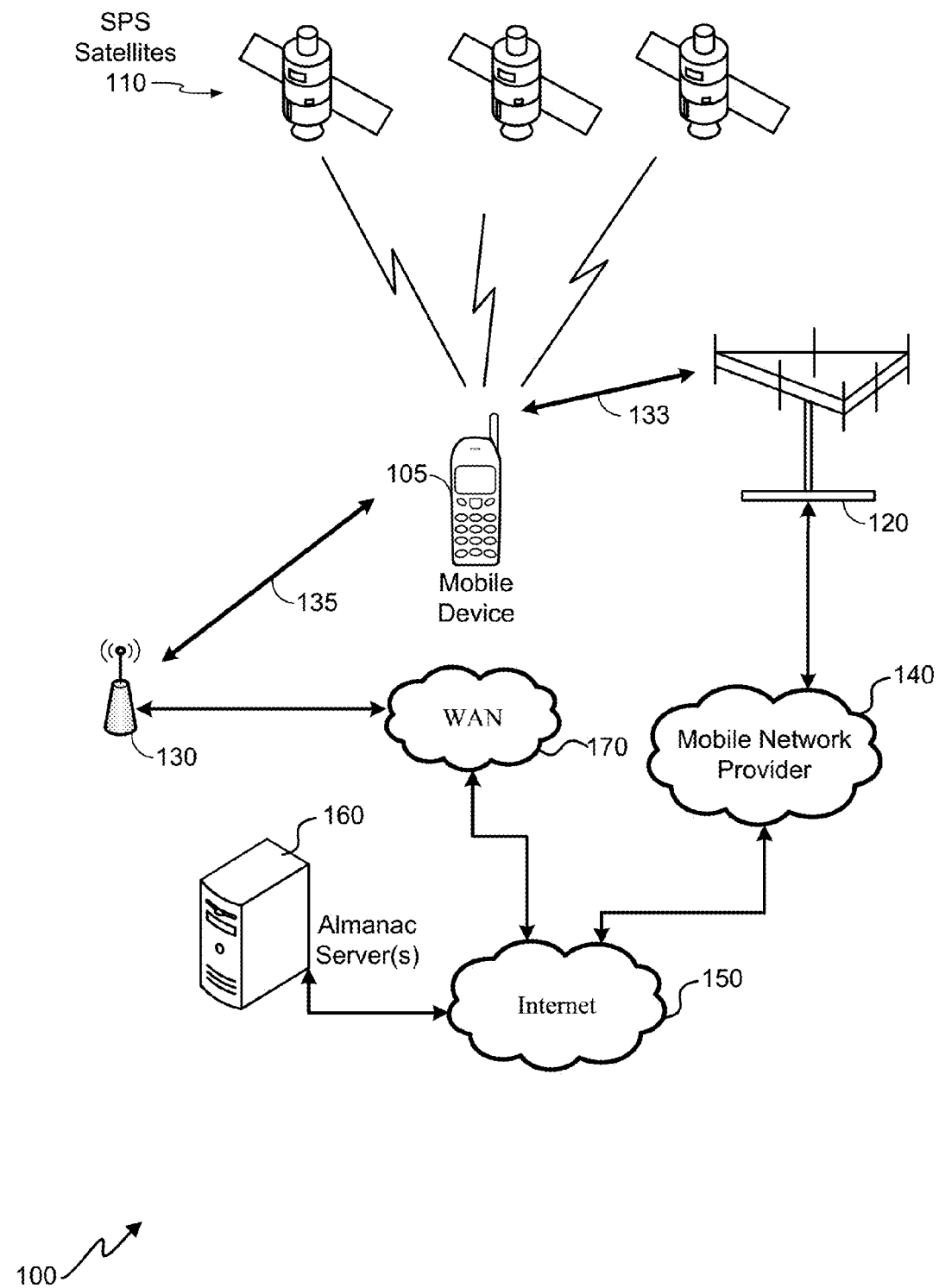
FIG. 1 is a simplified illustration of a positioning system, according to an embodiment.

FIG. 1, for example, is a simplified illustration of a positioning system 100 in which a mobile device 105 and/or other components of the positioning system 100 can process measurements and/or other data points to determine the position of the mobile device 105. The positioning system can include a mobile device 105, satellite positioning service (SPS) satellites 110, base transceiver station(s) 120, mobile network provider 140, access point(s) 130, almanac server(s) 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many antennas 120 and/or APs 130. Connections between illustrated components may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The antenna 120 is communicatively coupled to the mobile network provider 140 (e.g., a cellular network), which may be communicatively coupled with the Internet 150. The almanac server(s) 160 can also be communicatively coupled with the Internet 150. Thus, the mobile device 105 can communicate information with the almanac server(s) 160, for example, by accessing the Internet 150 via the antenna 120 using a first communication link 133. Additionally or alternatively, because an AP 130 and WAN 170 also may be communicatively coupled with the Internet 150, the mobile device 105 may communicate with the almanac server(s) 160 using a second communication link 135.

Depending on desired functionality, a location of the mobile device 105 can be determined in any of a variety of ways, by the mobile device and/or other devices in communication with the mobile device, which may be situation dependent. In some embodiments, the almanac server(s) and/or other devices (not shown) remote to the mobile device 105, for example, can be used to implement positioning methods for supporting the positioning of a mobile device 105, typically referred to as a target mobile device, target device or target. These positioning methods may comprise, for example, measurements by a mobile device of signals transmitted by SPS satellites 110, antennas 120 belonging to a wireless cellular network (e.g., the mobile network provider 140), a access points (APs) 130, and the like.

In addition (or as an alternative) to these position-determination methods, techniques described herein can utilize one or more almanac servers 160 that receive "crowdsourced" information from one or more mobile devices 105 regarding one or more AP(s) 130. This information can then be used by the almanac server(s) 160 to help determine an importance factor (e.g., reflecting a popularity) of each AP. In particular, the importance factor for a particular AP can be a value and/or calculation based on the number of measurements (e.g., signal/distance measurements) that have been made by the one or more mobile devices 105 with the particular AP and/or the number of unique mobile devices that communicated with the particular AP during a predetermined period of time. This information can be determined from the crowdsourcing information provided to the almanac server(s) 160 from the one or more mobile devices 105. In some embodiments, the number of APs in each tile may be reduced by excluding the APs with lower importance factors, as described in more detail below.

Tiles themselves also may be given a measure of importance (described elsewhere herein as a "priority value") and/or otherwise prioritized, using the importance factor of the APs in each tile. For example, tiles having the APs (individual or groups of APs) with high importance factors (aggregate or average) can be prioritized above those having APs with lower importance factors. A mobile device 105 can then request tile information from the almanac server(s) 160.

According to some embodiments, the almanac server(s) 160 may respond by sending a prioritized list of tiles based on the importance factor for the mobile device 105 to determine tile information to download. The mobile device 105 may then use the prioritized list to selectively download tiles in order of priority and/or other factors. The mobile device may determine the number of tiles to download based on available memory space. Once the mobile device has some estimate of the position, even if only a rough estimate, the mobile device can also select tiles based on, for example, the heading or destination of the user/mobile device. Since it is more likely that the user will travel to the same places that many other users travel to, the mobile device may download data only for tiles that have the highest probability of being traveled to, reducing the amount of data downloaded, download times, and energy consumption.

Alternatively, according to some embodiments, the almanac server(s) 160 instead may make the determination of tile information to send the mobile device 105 tile information for tiles having the highest priority values. Additional details regarding this and other embodiments are provided below.

FIG. 2 is a map of an example area 200 in which a positioning system, such as the positioning system 100 of FIG. 1, may operate. In FIG. 2, the area 200 is divided into several tiles 210, each encompassing regions of the area 200 having multiple APs. The locations of the various APs are shown by dots 220 at the center of coverage regions 230. (For simplicity, labels have been omitted for most tiles, AP locations, and coverage regions.) It will be understood that tiles 210 and coverage regions 230 may vary in size and shape, which may depend on AP density, geographical characteristics, desired functionality, and/or other factors.

As previously noted, tiles 210 may represent predefined regions of the area 200 by which APs 130 may be grouped. Additionally, the number of APs in each tile may vary, depending on the size and/or shape of the tile, AP density and/or distribution, and the like. In some embodiments, some tiles may include only a few APs, while others have hundreds, thousands, or more. In FIG. 2, tiles 210 represent regions of a grid (e.g., 1 km by 1 km), but as previously mentioned, the size and shape of tiles can vary, depending on desired functionality.

Almanac server(s) 160 can maintain an almanac that includes information regarding each of the tiles 210. For each tile 210, such information can include, for example, the tile's location and/or boundaries, the APs located within the tile, the names and/or locations of each AP within the tile, and the like. According to embodiments herein, the almanac server(s) 160 can further gather crowdsourcing information from mobile devices 105 within a tile 210 to determine an importance factor for each AP 130 and/or an importance factor for each tile. This information may also be kept in the almanac. When a mobile device 105 approaches, enters, or is predicted to enter a tile 210, the mobile device 105 can download the AP information for the tile 210 from the almanac server(s) 160 to help the mobile device 105, the almanac server(s) 160, and/or other devices (e.g., positioning server(s) or other devices that may receive positioning information from the mobile device) determine positioning information of the mobile device, based on the tile information. For example, by measuring its distance from various APs 130 within a tile 210 and by determining the known locations each of the various APs from the tile information, a mobile device 105 can calculate its estimated position.

FIG. 2 further illustrates the location 240 of a mobile device 105 within the area 200. Crowdsourcing information can be gathered from mobile devices at one or more locations within a tile 210. For instance, a particular mobile device 105 at a location 240 within a tile 210 may obtain one or more measurements pertaining to one or more APs 130 within the tile 210, and send those measurements to the almanac server(s) 160. This information can be sent as the measurements are obtained, in batches at scheduled times or time periods, upon receiving a request from the almanac server(s) 160, etc.

Measurements can include a variety of types of measurements. These can include, for example, values indicative of signal time of arrival, signal observed time difference of arrival (OTDOA), signal strength (e.g. received signal strength indication (RSSI)), signal round trip propagation time (RTT), number of APs detected, and/or other signal characteristics of one or more APs detected by the mobile device. In some embodiments, the mobile device 105 can take these measurements at scheduled times or time periods, at random times, in conjunction with other functionality (e.g., when the mobile device 105 is scanning for available WiFi network), etc. Additionally or alternatively, when providing crowdsourced information, the mobile device 105 may send location information, if known (which may be obtained from a WiFi or other WAN, SPS, or the like). Thus, in some embodiments, a mobile device 105 may send information regarding its location 240 (e.g., latitudinal and longitudinal coordinates), along with identities of APs 130 it detects at that location 240. The mobile device may further include a unique identity of the mobile device in the information sent, which can allow the almanac server(s) 160 to determine when a single mobile device 105 sends multiple sets of data, which the almanac server(s) 160 may take into account when determining the popularity and/or importance factor of APs 130 and/or tiles 210. It can be noted that, when obtaining measurements, a mobile device 105 need not use an AP 130 for data communication (that is, use the AP 130 to establish communication to the Internet or other data communication networks). Instead, a mobile device 105 may simply detect beacons sent by an AP 130 and/or obtain measurements related to the AP 130.

This measurement information can be sent to the almanac server(s) 160 by one or more mobile devices at multiple locations within a tile 210. As crowdsourced information accumulates, the almanac server(s) 160 can determine which APs 130 in a tile 210 are most commonly detected by the one or more mobile devices 105 providing the crowdsourced information. As previously noted, such a determination can include calculating an "importance factor," which may be a value quantifying the popularity of an AP. The importance factor for each AP 130 can be based on how many mobile devices 105 detect wireless signals from the AP 130, how many times the AP 130 is detected, and/or other factors. It can be noted, however, that where popularity is not desired (e.g., as indicated by user input) the importance factor for each AP 130 may be inversely related to the determined popularity.

The tile information stored by the almanac server(s) 160 and/or downloaded by a mobile device 105 can then be reduced (or otherwise optimized) based on the determined importance factors of APs. For instance, in some embodiments, the tile information for a particular tile 210, downloaded from the almanac server(s) 160 by a mobile device, may only include information regarding APs 130 located in the tile 210 that exceed a threshold importance factor. Alternatively, in some embodiments, tile information may include information regarding the APs 130 located in the tile 210 having the highest importance factors, based on percentage (e.g., top 10%, 15%, 30%, 50%, etc.), a predetermined number (e.g., top 20, 30, 50, 100 APs, etc.), or the like. In some embodiments, the almanac server(s) 160 may continue to store information regarding all APs 130 located within a tile 210, but may send tile information regarding only a subset of the APs to a mobile device, selected using techniques such as those as noted above.

In some embodiments, almanac server(s) 160 may dynamically create tile information, based on the importance factors of APs. For instance, rather than have tiles 210 with predetermined tile sizes as shown in FIG. 2, some embodiments may utilize almanac server(s) 160 that determine a tile size based on a number of APs having an importance factor above a threshold value. Upon receiving a request from a mobile device 105 to download tile information for a given location or region, the almanac server(s) 160 may start with the given location or region and increase (or decrease) a radius around the given location or region until a predetermined number of APs having an importance factor above a threshold value is found. Tile size may additionally or alternatively be based on a speed at which the mobile device 105 is determined to be traveling. For example, tiles may be dynamically created to cover larger geographical regions the faster a mobile device 105 is determined to be traveling, to help reduce the frequency at which additional tiles may need to be downloaded as the mobile device travels through the geographical regions represented by the tiles. (In other words, the larger the geographical regions, the longer it takes for the mobile device 105 to travel through it.) That said, the size of the tile may also be limited by the amount of memory available on the mobile device 105 to store the associated tile information. Thus, a mobile device 105 may send information regarding its speed and/or available memory to the almanac server(s) 160 for dynamic creation of a tile. After dynamically creating the tile, the almanac server(s) 160 may then send tile information that includes information on the APs and (optionally) the geographical boundaries of the created tile. Thus, techniques herein can be used to reduce the size of tile information downloaded by a mobile device by reducing the number of APs within a predetermined tile 210 and/or modifying the geographical boundaries of a tile.

As previously discussed, tiles 210 may be prioritized by the importance factor of the APs in each tile. For example, tiles 210 in a given area may be prioritized based on the importance factors of the APs 130 in each tile. For example, a tile may be prioritized based on a "combined" importance factor of its APs 130 (e.g., a sum or average of the importance factors of APs therein), a number of APs 130 with an importance factor exceeding a threshold importance factor, a combined importance factor of a subset of its APs 130 (e.g., the APs 130 with an importance factor exceeding a threshold importance factor, a predetermined number or percentage of APs having the highest importance factor, etc.), and/or other factors. In some embodiments, for example, a time of day may be utilized in the determination of the importance factor for APs and/or the priority of tiles 210, which may result in a resulting prioritized list of tiles that may vary depending on the time at which the tile was created or for which the tile may be used.

Once tiles are prioritized, the mobile device 105 or almanac server(s) 160 may determine which tile information to download from the almanac server(s) 160 to the mobile device 105, depending on desired functionality. For instance, when a mobile device 105 enters a new area such as the area 200 shown in the map of FIG. 2, the almanac server(s) 160 may send tile information regarding only a subset of the tiles 210, based on their priority. The subset may be chosen based on a number (e.g., the top 3, 5, 10 tiles, etc.) or percentage (top 5%, 10%, 20%, 50%, etc.) based on priority, importance factor of underlying APs (e.g., a combined importance factor of a tile exceeds a threshold), and/or other factors. In some embodiments, the mobile device 105 may make the selection of which tiles to download by receiving a prioritized list of tiles from the almanac server(s) 160 and selecting the tiles based on the list.

Depending on desired functionality, selecting (by either the almanac server(s) 160 or the mobile device 105, depending on desired functionality) tiles to download can be further based on additional factors. In some embodiments selection may be based on user preference. For example, an application executed by the mobile device 105 may enable the user to input preferences for shopping, entertainment, etc., which may be used (together with information regarding shopping, entertainment, etc. options within a tile 210) to select the most applicable tiles to download, based on tile priority and user preference. Additionally or alternatively, according to some embodiments, tile selection for download may be based on a location of the mobile device 105, a defined geographical area (e.g., tiles within a determined distance of the mobile device, which may be user-definable), a planned route of travel (which may be obtained, for example, by user input and/or information received from a navigation application executed by the mobile device), an amount of available memory,
or any combination thereof. These additional factors may be used by the mobile device 105 to make the selection of tiles to download, or may be sent to the almanac server(s) 160 (e.g., in a request for tiles to download) to make the selection.

Depending on desired functionality, the request for and download of one or more tiles by a mobile device 105 may be triggered at different times. For example, when a user gets off of a plane in a city, the mobile device 105 may request the most popular tiles for the surrounding area (e.g., within a predetermined distance of the mobile device 105). Thus, the mobile device 105 may request and download tiles when entering a new area. Additionally or alternatively, in some embodiments the request and download of tiles may be triggered when the mobile device is plugged into a power outlet (which can reduce concerns about the battery drain the request and download may cause) and/or has a battery power above a threshold. Additionally or alternatively, some embodiments may trigger the download of tiles along or near a planned route of travel once a planned route of travel is established by the mobile device (e.g., by a navigation application executed by the mobile device). To be clear, mobile devices used to crowdsource information used to create the tiles may be owned and used by different users at different times and in different locations than mobile devices used to download tiles (although, many situations may allow a single mobile device to both upload crowdsourcing information and download tiles). Thus, the download of a tile for a particular area made from crowdsourced information may be particularly helpful to a mobile device with no previous history in that area. According to some embodiments, as the mobile device develops a history in a particular area, a mobile device 105 may free up memory by deleting tile information corresponding to areas in the tile that are not visited by the user.

Figure 3:
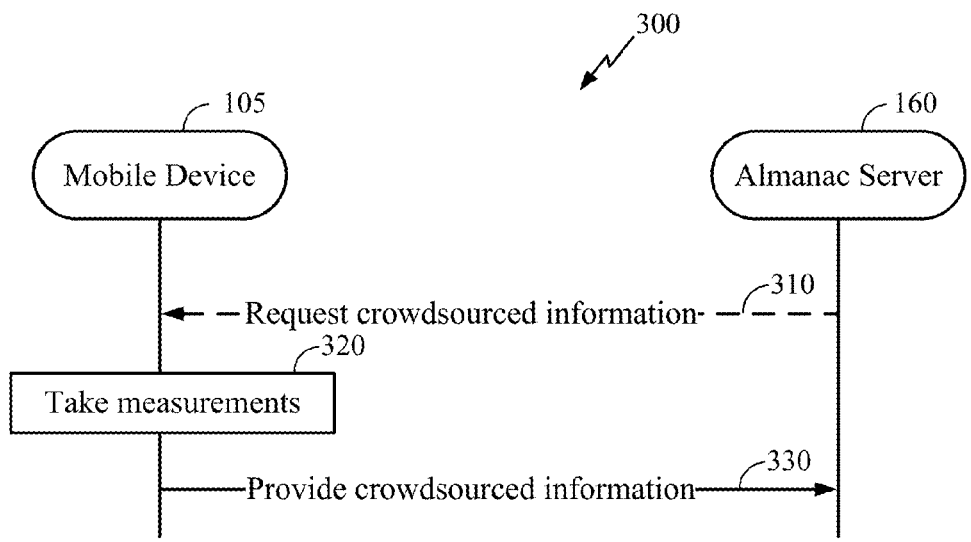
FIG. 3 is a call flow diagram that illustrates how an almanac server can receive crowdsourced information from a mobile device, according to an embodiment.
Figure 4A:
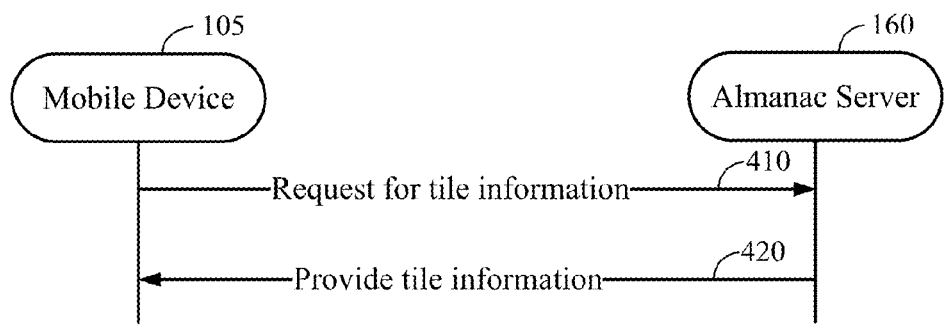
FIGS. 4A and 4B are call flow diagrams illustrating alternative embodiments for downloading tiles to the mobile device from the almanac server.
Figure 4B:
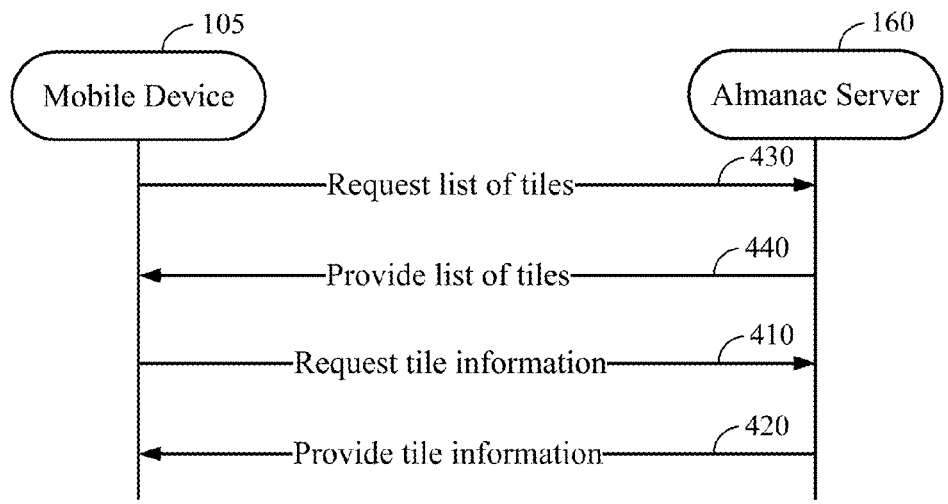

FIGS. 3-4B are call flow diagrams illustrating the interaction between a mobile device and an almanac server 160, according to some embodiments. It will be appreciated that the embodiments may utilize different communication technologies, protocols, formats, etc. to implement the illustrated interactions. Some embodiments may include additional or alternative actions. A person of ordinary skill in the art will recognize many variations.

FIG. 3 is a call flow diagram that illustrates how an almanac server 160 can receive crowdsourced information from a mobile device 105. Action 310 shows how the almanac server 160 can optionally send a request for crowdsourced information to the mobile device 105. At action 320, the mobile device obtains the information by taking measurements of APs, and at action 330 the mobile device provides the crowdsourced information to the almanac server 160. In the embodiment shown, taking measurements at action 320 may be triggered by the (optional) request for crowdsourced information at action 310. However, other embodiments may obtain information without such a request. Thus, in some embodiments, a request for crowdsourced information at action 310 may cause the mobile device 105 to provide crowdsourced information at action 330 based on previously-obtained measurements. Additionally or alternatively, a mobile device 105 may take measurements 320 automatically, whenever possible (e.g., when resources allow, when the measurements can be included in similar functionality, etc.). As noted above, some embodiments may obtain measurements and/or provide crowdsourced information periodically, based on a schedule, upon request by a server, and/or based on other triggers. Crowdsourced information can include the information described above, such as measurements regarding one or more APs, identification information of the mobile device 105, and the like. In some embodiments, the crowdsourced information may include consolidated measurement data.

FIGS. 4A and 4B are call flow diagrams illustrating alternative embodiments for downloading tiles to the mobile device 105 from the almanac server 160, in which the almanac server 160 selects the tile information to download (FIG. 4A) or the mobile device 105 selects the tile information to download (FIG. 4B). Here, the mobile device 105 may be the same or a different mobile device than the mobile device 105 of FIG. 3.

At action 410 of FIG. 4A, the mobile device 105 requests tile information from the almanac server 160. As indicated previously, this can be triggered by any of a variety of events, such as charging the mobile device's battery, determining a planned route of travel using an application executed by the mobile device 105, entering or coming in close proximity to an area for which the mobile device does not have tile information, and so forth. The request may further include information indicative of factors that may be used by the almanac server to determine a priority of tiles, in addition to the importance factors of the APs of each tile. These factors can include user preferences, location of the mobile device 105, a defined geographical area, planned route of travel, an amount of available memory, and the like. At action 420 the tile information is provided to the mobile device 105 by the almanac server 160. Here, tile information can include information regarding the location of APs in one or more tiles, where the tiles are selected based on a priority value determined for each tile based on the importance factor of each AP.

FIG. 4B is similar to FIG. 4A, but in FIG. 4B the mobile device 105 to determines what tile information to download. At action 430 the mobile device sends a request for a list of tiles from the almanac server 160, and the almanac server 160 responds at action 440 by providing the list of tiles. Here, the almanac server 160 can prioritize the list based on crowdsourced information. The list may also include additional information regarding tiles in the list of tiles—such as location information, tile characteristics (e.g., entertainment or shopping options, etc.), available memory, and the like—which may be used by the mobile device 105 to determine a subset of tiles from the list of tiles for which to download information, based on user preferences, current mobile device location, and/or other factors. Once the subset of tiles is identified, the mobile device 105 may send a request for tile information at action 410. Here the tile information can indicate which tiles were selected by the mobile device 105. Accordingly, at action 420, the almanac server 160 can provide tile information corresponding to the selected tiles.

Figure 5:
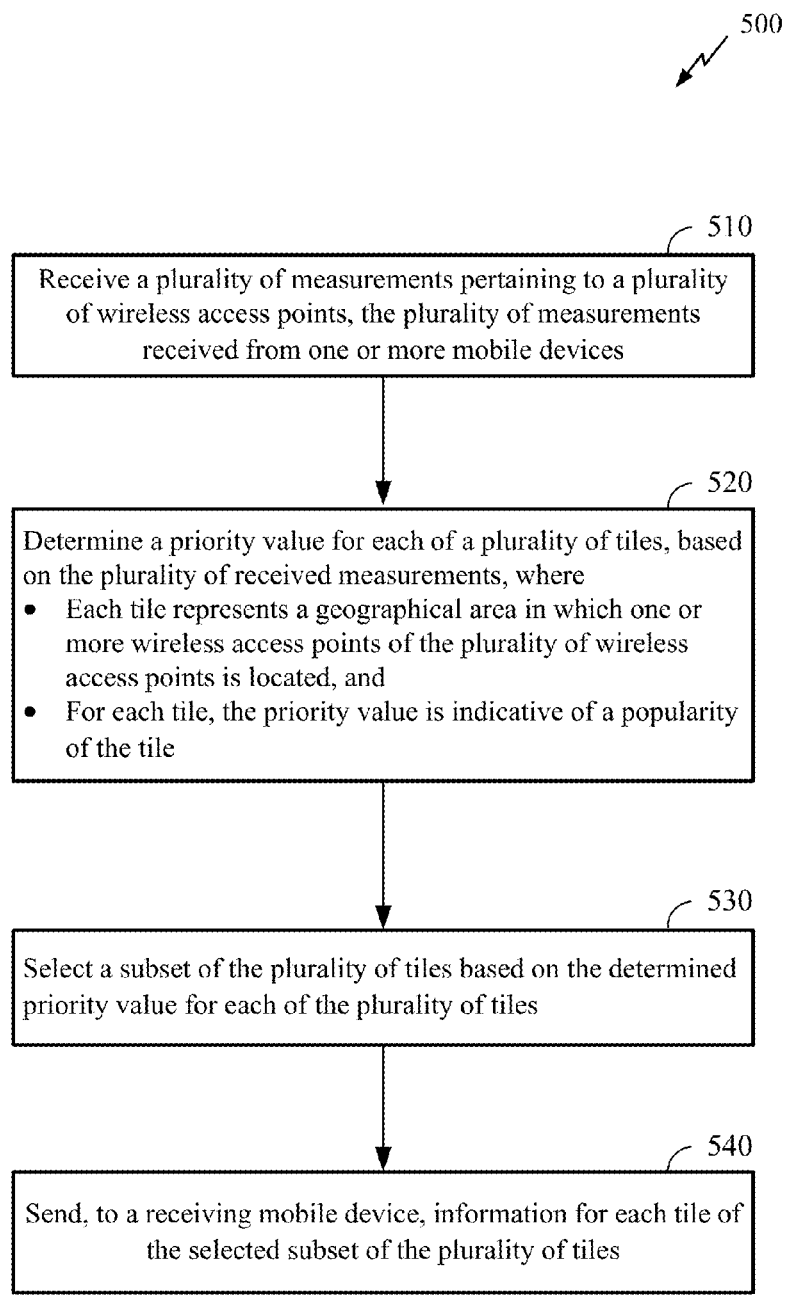
FIG. 5 is a process flow diagram that illustrates a method of acquiring and distributing access point location data via crowdsourcing, according to one embodiment.

FIG. 5 is a process flow diagram that illustrates a method 500 of acquiring and distributing access point location data via crowdsourcing, according to one embodiment. One or more blocks of the method 500 can be performed by a server, such as the almanac server(s) 160 of FIGS. 1 and 3-4B, for example. Particular means for performing the illustrated blocks can be performed by hardware and/or software components of a computer system, such as the example computer system illustrated in FIG. 8 and described in further detail below. Additionally, as with other figures provided herein, FIG. 5 is provided as an example. Other embodiments of the invention may perform similar methods in different manners, by, for example, adding, omitting, combining, separating, rearranging, and/or otherwise altering the blocks illustrated in FIG. 5. A person of ordinary skill in the art will recognize many variations.

Figure 8:
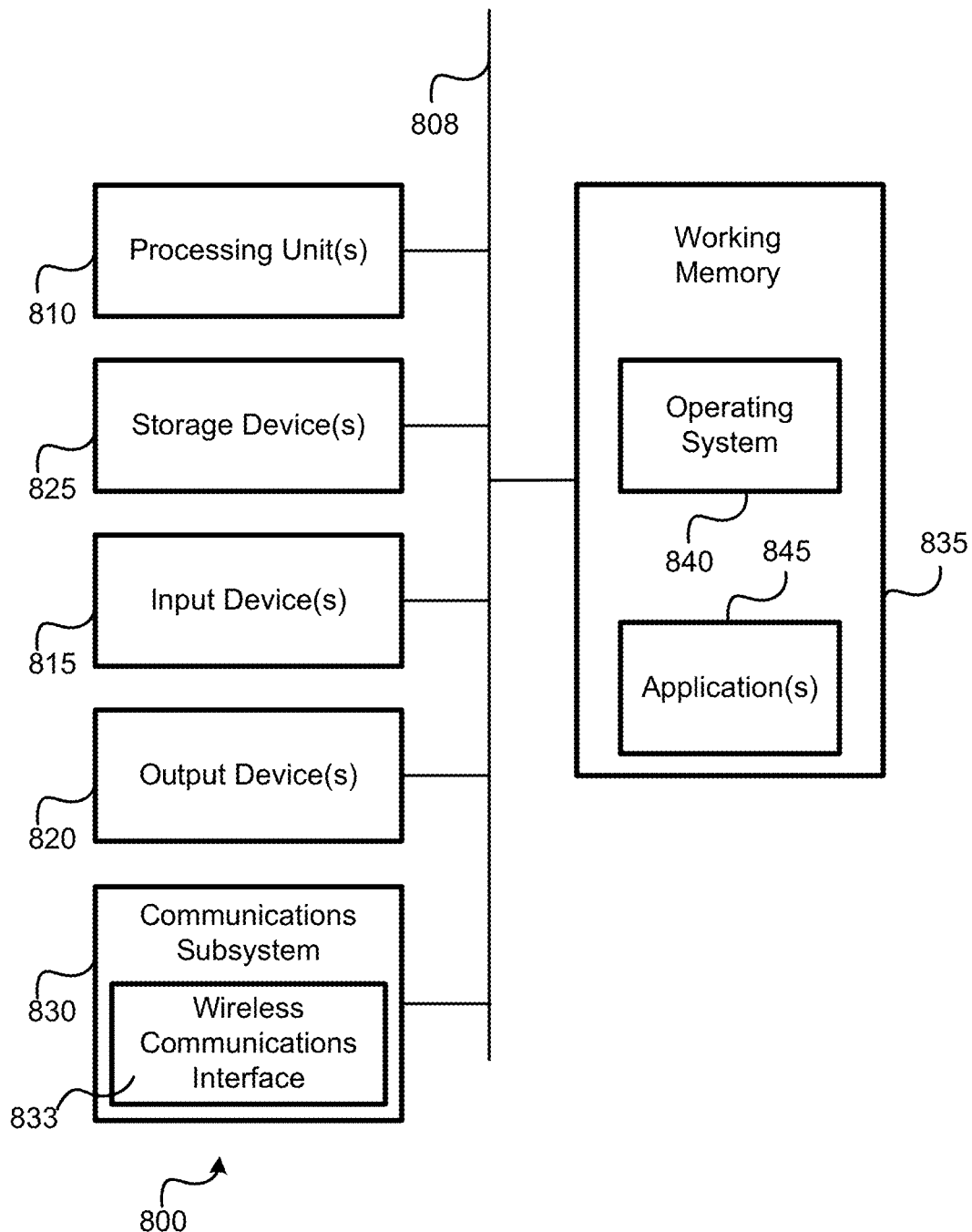
FIG. 8 is a block diagram of an embodiment of a computer system.

The functionality at block 510 comprises receiving a plurality of measurements pertaining to a plurality of wireless access points (such as APs 130 shown in FIG. 1 and described above), where the plurality of measurements are received from one or more mobile devices. As noted previously, the plurality of measurements can comprised RTT, RSSI, and or other measurements, and may be indicative of a number of times signals from each wireless access point were received by the one or more mobile devices. Means for performing the functionality of block 510 may comprise, for example, the processing unit(s) 810, storage device(s) 825, working memory 835, and/or communications subsystem 830, as shown in FIG. 8 and described in further detail below. For example, the processing unit(s) 810 can be configured to cause information received via the communications subsystem 830 from one or more mobile devices to be routed to and/or stored in storage device(s) 825 and/or working memory 835.

At block 520, a priority value for each of the plurality of tiles is determined, based on the plurality of received measurements. Each tile represents a geographical area in which one or more wireless access points of the plurality of wireless access points is located, and, for each tile, the priority value is indicative of a popularity of the tile. According to some embodiments, determining the priority value for each tile can comprise determining, an importance factor for each wireless access point of the plurality of wireless access points, based on the plurality of received measurements. As previously noted, the plurality of received measurements may be indicative of a popularity of a wireless access point, quantified by the number of times signals from the wireless access point were received by the one or more mobile devices. The importance factor for each wireless access point may then be based on the popularity of the access point. The priority of a tile may therefore be indicative of the popularity of the tile to the extent that the priority is determined by the popularity of each access point therein, as reflected by each access point's importance factor. However, in some instances (e.g., where a user is looking to find relatively unpopular locations), as noted above, the determined importance factor can be inversely proportional to the determined popularity. In some instances, the priority value of each tile may be based on a combined importance factor comprising a sum or average value of the importance factors for all of the wireless access points of the tile. As previously indicated, an importance factor of wireless access points and/or a priority value of one or more tiles may be based on additional information, such as information received from a mobile device requesting tile information. (Accordingly, importance factors and/or priority values may be dynamically determined after receiving the information the mobile device requesting tile information.) This information can include, for example, a user preference, a location of the mobile device, a defined geographical area, a planned route of travel, an amount of available memory, or any combination thereof. Means for performing the functionality of block 520 may comprise, for example, the processing unit(s) 810, storage device(s) 825, working memory 835, and/or application(s) 845, as shown in FIG. 8 and described in further detail below.

At block 530, a subset of the plurality of tiles is selected based on the determined priority value for each of the plurality of tiles. That is, a server can determine which tiles, from among the plurality of tiles, for a mobile device to download, based on the determined priority value of the tiles. For example, if the mobile device has enough allocated memory to download nine tiles (traditionally, in a grid of square tiles, the tile in which the mobile device is located and the eight adjacent tiles), the server may provide the tile in which device is located and eight tiles in a larger region (e.g., within a predetermined distance from the tile in which the mobile device is located) having the highest priority value. Some embodiments may incorporate and/or weigh factors such as proximity, mobile device history, and so forth in determining the priority value of the tiles.

Means for performing the functionality of block 520 may comprise, for example, the processing unit(s) 810, storage device(s) 825, working memory 835, and/or application(s) 845, as shown in FIG. 8 and described in further detail below. For example, the processing unit(s) 810 can be configured to select a subset of the plurality of tiles in accordance with an application 845 in working memory 835. Results may be stored in storage device(s) 825.

Figure 6:
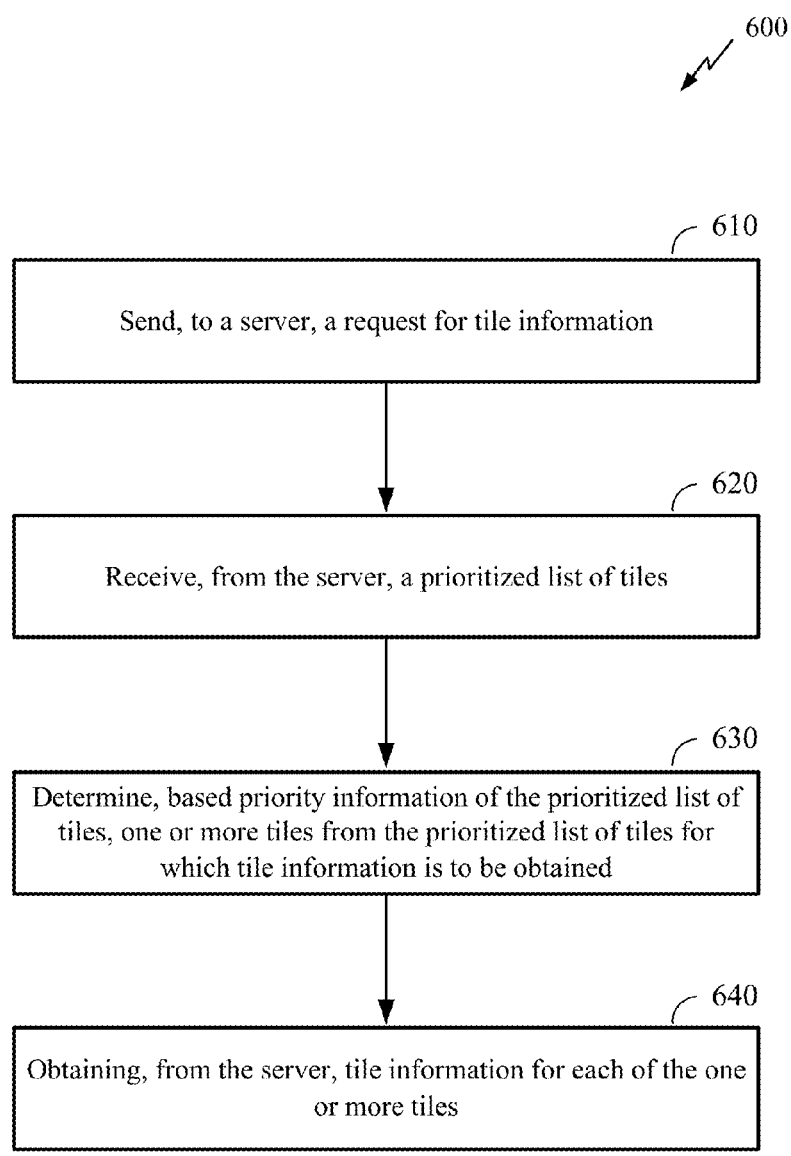
FIG. 6 is a process flow diagram that illustrates a method of acquiring tile information, according to one embodiment.

Finally, at block 540, information for each tile of a subset of the plurality of tiles is sent to the mobile device. In some embodiments, as shown in FIG. 5, the server may determine the subset based on the priority value for each of the plurality of tiles. In some embodiments, as shown in FIG. 6, the mobile device may determine the subset based on the priority value for each of the plurality of tiles, in which case the server may send a prioritized list of the of a plurality of tiles to the mobile device where the prioritized list indicative of the priority value for each of the plurality of tiles, and receive, from the mobile device, information identifying the subset of the plurality of tiles. The information for each tile sent to the mobile device can include information regarding the one or more wireless access points located in the tile, such as location, identification, and the like. In some embodiments, the information may further include the importance factor and/or popularity of each wireless access point. In some embodiments, a wireless access point heatmap and/or average density for each tile may also be conveyed, which can indicate popular locations within a tile and may be conveyed by the mobile device to a user using, for example, a map shown by a display of the mobile device. Means for performing the functionality of block 540 may comprise, for example, the processing unit(s) 810, storage device(s) 825, working memory 835, and/or communications subsystem 830, as shown in FIG. 8 and described in further detail below. For example, the processing unit(s) 810 can be configured to cause information to be retrieved from storage device(s) 825 and/or working memory 835 and sent to the mobile device via the communications subsystem 830.

FIG. 6 is a process flow diagram that illustrates a method 600 of acquiring tile information, according to one embodiment. One or more blocks of the method 600 can be performed by a mobile device, such as the mobile device 105 of FIGS. 1 and 3-4B, for example. Particular means for performing the illustrated blocks can be performed by hardware and/or software components of a mobile device 105, such as the components illustrated in FIG. 7 and described in further detail below. Additionally, as with other figures provided herein, FIG. 6 is provided as an example. Other embodiments of the invention may perform similar methods in different manners, by, for example, adding, omitting, combining, separating, rearranging, and/or otherwise altering the blocks illustrated in FIG. 6. A person of ordinary skill in the art will recognize many variations.

Figure 7:
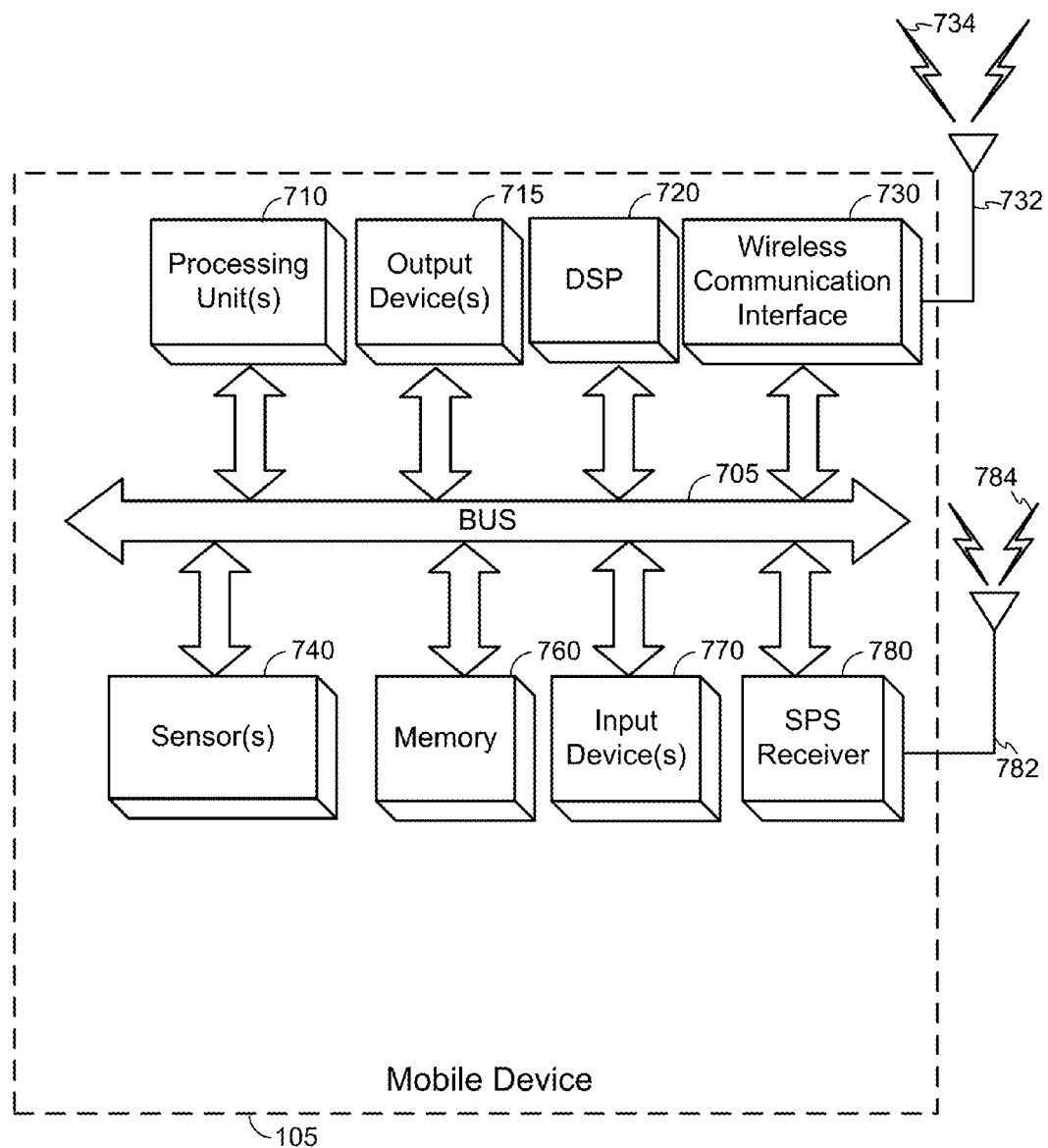
FIG. 7 is a block diagram of an embodiment of a mobile device.

The functionality at block 610 comprises sending, to a server, a request for tile information. As noted previously, a mobile device may be triggered to send the request to an almanac server in response to a triggering event, such as when entering a new area for which tile information has not yet been received, when the mobile device is plugged into a power outlet and/or has a battery power above a threshold, when a planned route of travel is established by the mobile device (e.g., by a navigation application executed by the mobile device), and/or other factors. Means for performing the functionality of block 610 may comprise, for example, the processing unit(s) 710, memory 760, wireless communication interface 730 and/or antenna 732, as shown in FIG. 7 and described in further detail below. For example, the processing unit(s) 710 can be configured to cause the request for tile information to be sent via the wireless communication interface 730. Information that may be included in the request (e.g., an identity of the mobile device, a stored location, planned route of travel, etc.) may be stored in the memory 760.

At block 620 a prioritized list of tiles is received from the server. As indicated previously, the list of tiles may be prioritized based on a priority value for each tile. And the priority value of each tile may be included in the prioritized list. Means for performing the functionality of block 620 may comprise, for example, the processing unit(s) 710, memory 760, wireless communication interface 730 and/or antenna 732, as shown in FIG. 7 and described in further detail below. For example, the processing unit(s) 710 can be configured to cause the prioritized list received via the wireless communication interface 730 to be stored in the memory 760.

At block 630 one or more tiles from the prioritized list of tiles for which tile information is to be obtained is determined, based on priority information of the prioritized list of tiles. In some embodiments, this determination can be made based on a priority value of each tile in the prioritized list of tiles, which may be include in the prioritized list of tiles. In such instances, the one or more tiles may be determined where each has a priority value above a threshold value. In some embodiments, the mobile device may determine the one or more tiles further based on one or more of one or more of a user preference, a location of the mobile device, a defined geographical area, a planned route of travel, an amount of available memory, or any combination thereof. Means for performing the functionality of block 630 may comprise, for example, the processing unit(s) 710, input device(s) 770, and/or memory 760 as shown in FIG. 7 and described in further detail below. For example, the processing unit(s) 710 can be configured to execute an application stored in memory 760 to determine the one or more tiles. Input devices(s) 770 may be used to obtain user input in instances where a user preference is used in the determination.

At block 640 tile information for each of the one or more tiles is obtained from the server. As noted previously, tile information for a tile can include information regarding the one or more wireless access points located in the tile, such as location, identification, and the like. This information can be used by the mobile device for positioning purposes when the mobile device is located within the geographical boundaries of the tile. Means for performing the functionality of block 640 may comprise, for example, the processing unit(s) 710, memory 760, wireless communication interface 730 and/or antenna 732, as shown in FIG. 7 and described in further detail below. For example, the processing unit(s) 710 can be configured to cause the tile information received via the wireless communication interface 730 to be stored in the memory 760.

FIG. 7 illustrates an embodiment of a mobile device 105, which can be utilized as described herein above. For example, the mobile device 105 can be used in the positioning system 100 of FIG. 1 and/or to provide data or perform other functions as described in relation to FIGS. 3-6. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations.

The mobile device 105 is shown comprising hardware elements that can be electrically coupled via a bus 705 (or may otherwise be in communication, as appropriate). The hardware elements may include a processing unit(s) 710 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 7, some embodiments may have a separate DSP 720, depending on desired functionality. The mobile device 105 also may comprise one or more input devices 770, which may comprise without limitation one or more touch screens, touch pads, microphones, buttons, dials, switches, and/or the like; and one or more output devices 715, which may comprise without limitation, one or more displays, light emitting diode (LED)s, speakers, and/or the like.

The mobile device 105 might also include a wireless communication interface 730, which may comprise without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 730 may permit data (such as crowdsourced information, as described in the embodiments herein) to be communicated with a network, wireless access points, other computer systems, and/or any other electronic devices described herein, such as the mobile network provider 140, internet 150, and/or other networks described in relation to FIG. 1. The communication can be carried out via one or more wireless communication antenna(s) 732 that send and/or receive wireless signals 734.

Depending on desired functionality, the wireless communication interface 730 may comprise separate transceivers to communicate with base transceiver stations (e.g., antenna 120) and other wireless devices and access points. As indicated previously with respect to FIG. 1, these different data networks may comprise various network types. Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 105 can further include sensor(s) 740. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 740 can be utilized, among other things, for dead reckoning and/or other positioning methods. Such positioning methods may be used to determine a location of the mobile device 105, which can be provided as part of the crowdsourced information detailed herein.

Embodiments of the mobile device may also include an SPS receiver 780 capable of receiving signals 784 from one or more SPS satellites (such as SPS satellites 110, of FIG. 1) using an SPS antenna 782. Such positioning can be utilized to complement and/or incorporate the techniques described herein. The SPS receiver 780 can extract a position of the mobile device, using conventional techniques, from SPS SVs of an SPS system, such as GNSS (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 760. The memory 760 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

FIG. 8 illustrates an embodiment of a computer system 800, which may be incorporated, at least in part, into devices such as the one or more almanac servers 160 as described in FIGS. 1 and 3-6, and/or a computing device incorporated and/or communicatively connected therewith, as described herein. FIG. 8 provides a schematic illustration of one embodiment of a computer system 800 that can perform the methods provided by various other embodiments, such as the method described in relation to FIG. 5. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical locations.

The computer system 800 is shown comprising hardware elements that can be electrically coupled via a bus 805 (or may otherwise be in communication, as appropriate). The hardware elements may include processing unit(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIGS. 3-6. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which may comprise wireless communication technologies managed and controlled by a wireless communication interface 833, as well as wired technologies. As such, the communications subsystem may comprise a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, UWB interface, etc.), and/or the like. The communications subsystem 830 may include one or more input and/or output communication interfaces, such as the wireless communication interface 833, to permit data to be exchanged with a network, mobile devices (such as the mobile device 105 of FIGS. 1 and 3-6), other computer systems, and/or any other electronic devices described herein. Hence, the communications subsystem 830 may be used to receive and send data (e.g., location data, and almanac, etc.) as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 3-6, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods. For example, the computer system 800 and software elements can be used to build and maintain an almanac as described herein (e.g., a database and/or other data structure that has the approximate locations of a plurality of antennas and/or the approximate coverage regions of the plurality of antennas. These approximate locations and/or coverage regions can be determined and/or updated using the techniques described herein. When changes to the almanac are made (e.g., due to changes detected using the techniques described herein), the changes can be propagated to mobile devices via the Internet and/or other communication networks. Depending on desired functionality, these changes can be propagated individually or as part of a revised almanac. Also, depending on desired functionality, revisions can be propagated once a change is detected, periodically (e.g., every night at midnight, if any changes are detected), and/or based on other schedules and/or triggering events.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A server for acquiring and distributing access point location data via crowdsourcing, the server comprising:
   a communication interface;
   a memory; and
   a processing unit communicatively coupled with the communication interface and the memory, the processing unit configured to cause the server to:
   receive, via the communication interface, a plurality of measurements pertaining to a plurality of wireless access points, the plurality of measurements received from one or more mobile devices;
   determine a priority value for each tile of a plurality of tiles by:
      determining an importance factor for each wireless access point of the plurality of wireless access points, based on the plurality of received measurements, wherein the importance factor of each wireless access point of the plurality of wireless access points is indicative of a popularity of the wireless access point, quantified by a number of mobile devices that have received signals from the wireless access point, and
      for each tile of at least a portion of the plurality of tiles, creating a combined importance factor of two or more wireless access points located in a geographical area covered by the respective tile by combining the determined importance factors of the two or more wireless access points, wherein for each tile of the at least the portion of the plurality of tiles, the determined priority value of the tile is based on the combined importance factor of the two or more wireless access points of the respective tile;

receive, from a requesting mobile device, a request for tile information;

select a subset of the plurality of tiles based on the determined priority value for each of the plurality of tiles; and send, via the communication interface to the requesting mobile device, information for each tile of the selected subset of the plurality of tiles, wherein, for each tile, the information for the respective tile comprises location information regarding at least one wireless access point located in the geographical area covered by the respective tile, wherein the information for the tile enables location determination for mobile devices located in the geographic area covered by the respective tile.

2. The server of claim 1, wherein, for each wireless access point, the determined importance factor is inversely proportional to the popularity.

3. The server of claim 1, wherein the processing unit is configured to cause the server to determine the priority value for each of the plurality of tiles further based on information received from the requesting mobile device.

4. The server of claim 3, wherein the information received from the requesting mobile device includes one or more of:
   a user preference,
   a location of the requesting mobile device,
   a defined geographical area,
   an amount of available memory,
   a planned route of travel, or
   any combination thereof.

5. The server of claim 1, wherein the processing unit is configured to cause the server to determine an average density of wireless access points, a wireless access point heatmap, or both, for each tile of the selected subset of the plurality of tiles, based on the plurality of measurements.

6. The server of claim 1, wherein the one or more mobile devices does not include the requesting mobile device.

7. A mobile device comprising:
   a communication interface;
   a memory; and
   a processing unit communicatively coupled with the communication interface and the memory, the processing unit configured to cause the mobile device to:
      send, via the communication interface to a server, a request for tile information;
      receive, via the communication interface from the server, a prioritized list of tiles;
      determine, based on priority information of the prioritized list of tiles, one or more tiles from the prioritized list of tiles for which tile information is to be obtained, wherein the determination of the one or more tiles includes, for each tile of the prioritized list of tiles, determining a priority value of the tile based on a combined importance factor of two or more wireless access points of the respective tile, and wherein an importance factor of each wireless access point of the two or more wireless access points is indicative of a popularity of the wireless access point, quantified by a number of mobile devices that have received signals from the wireless access point; and
      obtain, from the server via the communication interface, tile information for each tile of the one or more tiles, wherein, for each tile of the one or more tiles, the information for the respective tile comprises location information regarding at least one wireless access point located in a geographical area covered by the respective tile, wherein the information for the tile enables location determination for mobile devices located in the geographic area covered by the respective tile.

8. The mobile device of claim 7, wherein the processing unit is configured to cause the mobile device to determine the one or more tiles by determining the priority value for each of the one or more tiles is greater than a threshold value.

9. The mobile device of claim 7, wherein the processing unit further configured to cause the mobile device to determine the one or more tiles of the prioritized list of tiles further based on one or more of:
   a user preference,
   a location of the mobile device,
   a defined geographical area,
   an amount of available memory,
   a planned route of travel, or
   any combination thereof.

10. The mobile device of claim 7, wherein the processing unit is configured to cause the mobile device to send the request for tile information in response to determining that the mobile device is charging, has a battery power above a threshold, or both.

11. A method of acquiring and distributing access point location data via crowdsourcing, the method comprising:
   receiving a plurality of measurements pertaining to a plurality of wireless access points, the plurality of measurements received from one or more mobile devices;
   determining a priority value for each tile of a plurality of tiles by:
      determining an importance factor for each wireless access point of the plurality of wireless access points, based on the plurality of received measurements, wherein the importance factor of each wireless access point of the plurality of wireless access points is indicative of a popularity of the wireless access point, quantified by a number of mobile devices that have received signals from the wireless access point, and
      for each tile of at least a portion of the plurality of tiles, creating a combined importance factor of two or more wireless access points located in a geographical area covered by the respective tile by combining the determined importance factors of the two or more wireless access points, wherein for each tile of the at least the portion of the plurality of tiles, the determined priority value of the tile is based on the combined importance factor of the two or more wireless access points of the respective tile;
   receiving, from a requesting mobile device, a request for tile information;
   selecting a subset of the plurality of tiles based on the determined priority value for each of the plurality of tiles; and
   sending to the requesting mobile device, information for each tile of the selected subset of the plurality of tiles, wherein, for each tile, the information for the respective tile comprises location information regarding at least one wireless access point located in the geographical area covered by the respective tile, wherein the information for the tile enables location determination for mobile devices located in the geographic area covered by the respective tile.

12. The method of claim 11, wherein, for each wireless access point, the determined importance factor is inversely proportional to the popularity.

13. The method of claim 11, further comprising determining the priority value for each of the plurality of tiles further based on information received from the requesting mobile device.

14. The method of claim 13, wherein the information received from the requesting mobile device includes one or more of:
 a user preference,
 a location of the requesting mobile device,
 a defined geographical area,
 an amount of available memory,
 a planned route of travel, or
 any combination thereof.

15. The method of claim 11, further comprising determining an average density of wireless access points, a wireless access point heatmap, or both, for each tile of the selected subset of the plurality of tiles, based on the plurality of measurements.

\* \* \* \* \*